(12) United States Patent
Vreeland, Jr. et al.

(10) Patent No.: US 7,282,256 B2
(45) Date of Patent: *Oct. 16, 2007

(54) PHOTOSENSITIVE RESIN LAMINATE FOR SIGN BOARDS

(75) Inventors: Howard B. Vreeland, Jr., Bryan, OH (US); James Chapman, Yeadon, PA (US); Yuji Taguchi, Ohtsu (JP)

(73) Assignees: Anderson & Vreelan, Bryan, OH (US); Nova Polymer, Inc., Yeadon, PA (US); Toyo Boseki Kabushiki Kaisha, Osaka (JP)

( * ) Notice: Subject to any disclaimer, the term of this patent is extended or adjusted under 35 U.S.C. 154(b) by 390 days.

This patent is subject to a terminal disclaimer.

(21) Appl. No.: 10/319,531

(22) Filed: Dec. 16, 2002

(65) Prior Publication Data

US 2003/0091802 A1 May 15, 2003

Related U.S. Application Data

(63) Continuation of application No. 09/709,494, filed on Nov. 13, 2000, now abandoned.

(51) Int. Cl.
*B32B 7/02* (2006.01)
*G03C 1/00* (2006.01)

(52) U.S. Cl. .................. 428/212; 428/213; 430/271.1; 430/273.1; 430/320; 430/258; 430/262

(58) Field of Classification Search ................ 428/212, 428/213; 430/271.1, 273.1, 320, 258, 262
See application file for complete search history.

(56) References Cited

U.S. PATENT DOCUMENTS

| 4,041,204 | A | * | 8/1977 | Hepher et al. ............... 428/199 |
| 4,370,388 | A | | 1/1983 | Mito et al. |
| 4,719,169 | A | * | 1/1988 | Platzer et al. ............... 430/258 |
| 5,100,721 | A | | 3/1992 | Akao |
| 5,374,184 | A | * | 12/1994 | Platzer et al. ............... 430/262 |
| 6,171,663 | B1 | | 1/2001 | Hanada et al. |
| 6,306,492 | B1 | | 10/2001 | Yamada et al. |
| 6,743,569 | B2 | * | 6/2004 | Motoi et al. ............. 430/271.1 |
| 2002/0006581 | A1 | * | 1/2002 | Motoi et al. ............. 430/271.1 |

* cited by examiner

*Primary Examiner*—B. Hamilton Hess
*Assistant Examiner*—Lawrence Ferguson
(74) *Attorney, Agent, or Firm*—Morrison & Foerster LLP

(57) ABSTRACT

A photosensitive resin laminate for a sign board is provided, which laminate has a support and a photosensitive resin layer having a thickness of not less than 500 μm formed at least on the support via an adhesive layer, wherein the photosensitive resin layer has an absorbance at 400 nm of not more than 0.4 and the support is a modified polyethylene terephthalate layer on which a UV quality change preventive layer is formed. A sign board obtained using a photosensitive resin laminate of the present invention has a transparent and colorless support having superior design and superior light resistance with a smaller coloring level due to UV. In other words, the photosensitive resin laminate of the present invention can provide a suitable sign board and greatly contributes to the industry.

12 Claims, No Drawings

PHOTOSENSITIVE RESIN LAMINATE FOR SIGN BOARDS

REFERENCE TO RELATED APPLICATIONS

This application is a continuation of Ser. No. 09/709,494, filed Nov. 13, 2000 now abandoned. The prior application, in its entirety, is hereby incorporated by reference.

TECHNICAL FIELD OF THE INVENTION

The present invention relates to a laminate comprising a photosensitive resin, which laminate is used for sign boards such as display panel, decoration shield, name plate, Braille board and the like. More particularly, the present invention relates to a photosensitive resin laminate for sign boards, which is superior in light resistance of a support.

BACKGROUND OF THE INVENTION

A photosensitive resin layer is exposed to light through a pattern and developed to produce a sign board and the like. Photosensitive resin laminates made by the use of a photosensitive resin are disclosed in JP-A-58-55927, JP-A-9-6267 and the like and used for Braille panels having a relief, sign boards containing Braille and the like.

The need for good designs of sign boards is increasing nowadays and there has been made a new market for sign boards that make use of the transparency of support. However, a transparent and colorless support is also colored by UV light when placed near a window.

SUMMARY OF THE INVENTION

An object of the present invention is to provide, in a photosensitive resin composition sign board used for display panel, decoration shield, name plate, Braille board and the like, a photosensitive resin laminate for sign boards, comprising a transparent and colorless support superior in design, which has superior light resistance as evidenced by a smaller degree of coloring due to UV.

According to the present invention, a photosensitive resin laminate for sign boards is provided, which comprises a support comprising a base material comprising modified polyethylene terephthalate and a UV quality change preventive layer, an adhesive layer, and a photosensitive resin layer having an absorbance at 400 nm of not more than 0.4 and a thickness of not less than 500 µm.

The above-mentioned photosensitive resin laminate for sign boards, wherein the UV quality change preventive layer comprises a UV absorber and has a thickness of 5 µm–100 µm, the above-mentioned photosensitive resin laminate for sign boards, wherein the UV quality change preventive layer is produced by coextrusion forming, and the above-mentioned photosensitive resin laminate for sign boards, wherein the support shows a total light transmission of not less than 60%. They show particularly superior light resistance.

DETAILED DESCRIPTION OF THE INVENTION

The UV quality change preventive layer is formed at least on one side of a substrate. Examples of the UV quality change preventive layer include a layer containing a UV absorber and a modified polyethylene terephthalate resin, a coating layer containing a UV absorber, a resin layer that shows smaller changes in quality due to UV and the like. Of these, a layer containing a UV absorber and a modified polyethylene terephthalate resin is preferable, in view of the adhesive property between the substrate and other layers.

Examples of the UV absorber include a low molecular weight UV absorber, a high molecular weight UV absorber obtained by introducing a low molecular weight UV absorber into a polymer and the like. Considering the migration to other layers, a high molecular weight UV absorber obtained by introducing a UV absorber into a molecule is preferable.

Examples of the low molecular weight UV absorber include a compound having benzene as the skeleton such as 2-aminobenzophenone and the like, a compound having naphthalene as the skeleton such as propylene glycol 2-hydroxy-3-naphthoic acid ester and the like, a compound having an anthracene skeleton such as 9-anthracenemethanol and the like, a compound having a benzthiazole skeleton such as dihydrothio-p-toluidine and the like, a compound having a quinazoline skeleton such as quinazolidinedione and the like, and the like. Of these, benzophenone compounds and dihydrothio-p-toluidine are preferable.

The high molecular weight UV absorber can be obtained by polymerizing an acrylic ester monomer, into which the above-mentioned low molecular weight UV absorber is introduced by ester bond and the like.

The coating layer containing a UV absorber can be made from a commercially available UV resistant coating agent. Examples of the coating agent include acrylic polymer coating agent, urethane polymer coating agent and the like.

The resin layer showing less quality change due to UV may be a resin transparent and superior in light resistance. Examples thereof include resin layers made from methyl polymethacrylate, a copolymer of methyl methacrylate and styrene and the like.

In the present invention, a support comprises a substrate made from modified polyethylene terephthalate and the above-mentioned UV quality change preventive layer is formed on at least one side of the substrate. Specific examples of the modified polyethylene terephthalate resin to form the substrate include a modified polyethylene terephthalate resin wherein dicyclohexyldimethanol and the like are copolymerized as a diol component, a modified polyethylene terephthalate resin wherein isophthalic acid and the like are copolymerized as a dicarboxylic acid component, and the like. In consideration of the transparency and properties, a copolymer of dicyclohexyldimethanol is preferable.

A method for forming a UV quality change preventive layer to be used in the present invention on a substrate include a method comprising coating a substrate made from modified polyethylene terephthalate with a composition capable of forming a UV quality change preventive layer, a method comprising coextruding a modified polyethylene terephthalate resin composition containing a UV absorber simultaneously when forming a substrate from a modified polyethylene terephthalate resin, a method comprising adhering a plate made from a resin showing less quality change due to UV to a modified polyethylene terephthalate resin plate, and the like. Of these, the coextrusion forming method is advantageous in terms of production cost.

The thickness of the UV quality change preventive layer to be formed on the substrate is preferably from 5 µm to 100 µm, more preferably from 20 µm to 80 µm, desirably from 30 µm to 70 µm. When the thickness is less than 5 µm, the quality change preventive layer may have an insufficient strength and when it exceeds 100 μm, the production may become difficult due to unfeasible coating and the like.

The support to be used in the present invention has a thickness of generally 1 mm–10 mm, which is determined according to the use and design. A support having a thickness of less than 1 mm tends to suffer from a warp of itself, making its use for a sign board inapplicable. When the thickness exceeds 10 mm, the plate will not cut easily and become heavy, which is disadvantageous.

The support has a Shore D hardness of preferably not less than 35°, more preferably not less than 55°, particularly preferably 75°. When the Shore D hardness is less than 35°, the resin plate suffers from a warp of itself, and unpreferably loses retainability of a sign board.

The Shore D hardness is measured by a Shore durometer by measuring the depth of a needle, that was pressed into a specimen upon application of a load (4536 g).

The support is preferably transparent from the aspect of design. It has a total light transmission according to ASTM D-1003 of not less than 60%, preferably not less than 65%, particularly preferably not less than 70%. When the total light transmission is less than 60%, the support has insufficient grade upon processing into a sign board and cannot provide a sign board superior in the design.

The support needs to be clear and colorless and shows an absorbance at 400 nm of not more than 0.4, preferably not more than 0.3. When the absorbance exceeds 0.4, the support unpreferably turns yellow.

The absorbance is measured for UV at 400 nm by a U-3210 self-recording spectrophotometer manufactured by Hitachi, Ltd.

The photosensitive resin composition constituting the photosensitive resin layer may be any known composition. Specific examples include a photosensitive resin composition containing a soluble high molecular weight compound (e.g., polyvinyl alcohol, polyamide, polyether ester amide, polyether amide, polyurethane and the like), a photopolymerizable or photocrosslinkable monomer (e.g., acrylate of polyhydric alcohol, epoxy acrylate of polyhydric alcohol, N-methylolacrylic amide and the like), a photopolymerization initiator (e.g., benzyldimethyl ketal, benzoindimethyl ether and the like), and heat stabilizer, plasticizer, surfactant, UV absorber and the like on demand, and the like.

The photosensitive resin layer needs to be clear and colorless, and shows an absorbance at 400 nm of not more than 0.4, preferably not more than 0.3. When the absorbance exceeds 0.4, the resin layer unpreferably turns yellow.

For suitable use particularly for Braille, a photosensitive resin layer should be not less than 500 μm, preferably 800–1200 μm. When it is not more than 1200 μm, particularly superior image reproducibility can be achieved.

The photosensitive resin laminate of the present invention is obtained by forming an adhesive layer to be mentioned below on the above-mentioned support and laminating a photosensitive resin layer by a known method. The method for laminating a photosensitive resin composition on a support may be any such as heat press, injection molding, melt extrusion, solution casting, lamination and the like.

For example, a photosensitive resin layer is laminated in advance on a resin film such as polyethylene terephthalate and the like (hereinafter to be referred to as photosensitive resin laminate precursor), the resin film is peeled off when processing it into a sign board, and the photosensitive resin layer is laminated, via an adhesive layer, on a support of the present invention produced separately.

The above-mentioned photosensitive resin laminate precursor can be produced by a method generally employed for production of a photosensitive resin laminate for printing plates. Examples of the photosensitive resin layer precursor include one comprising a resin film (preferably without adhesive property), a photosensitive resin layer, a slip coat layer (thickness: e.g., 1–3 μm) obtained from a transparent non-adhesive polymer (e.g., polyvinyl alcohol, cellulose etc.), that disperses or dissolves in a developing solution and a cover film (material: polyethylene terephthalate, thickness: 125 μm), and the like.

An adhesive layer intervening between a support and a photosensitive resin layer (optionally having a slip coat layer and cover film) can be formed using a known adhesive. Examples thereof include a polyester-urethane adhesive obtained by curing a polyester soluble in organic solvents with polyhydric isocyanate, an epoxy adhesive and the like. Of these, a polyester-urethane adhesive is preferable because it is superior in adhesion to a photosensitive resin. Of the polyester-urethane adhesives, particularly an adhesive comprising polyester and isocyanulate type polyhydric isocyanate is more desirable because it can be dried at a low temperature.

The composition from which to form an adhesive layer can contain a small amount of additives. Examples of the additive include plasticizer, dye, UV absorber, halation preventive, surfactant, photopolymerizable vinyl monomer and the like.

The method for forming an adhesive layer on a support generally includes applying a composition for adhesive layer onto a support in a predetermined thickness and removing the solvent. The coating method may be a known method such as roll coater, curtain flow coater, slit die coater, gravure coater, spray and the like. The adhesive layer after application to a support can be dried generally by blowing a hot air in a drying furnace.

The drying temperature of the adhesive layer is preferably 15° C.–80° C., desirably 20° C.–70° C. When it exceeds 80° C., the support is unpreferably warped or suffers from other deformation. When it is less than 15° C., the drying requires a longer time, which is not preferable.

The adhesive layer preferably has a thickness of 0.5 μm–100 μm. When the thickness is less than 0.5 μm, the photosensitive resin layer is not adhered to an adhesive layer. When the thickness of the adhesive layer exceeds 100 μm, the applied solution requires a longer time for drying. A more preferable thickness is 1 μm–50 μm.

As the method for forming a sign board from the photosensitive resin laminate having a support, an adhesive layer and a photosensitive resin layer (optionally having a slip coat layer and a cover film), a method generally employed for preparing a printing plate can be used. For example, a negative film having a transparent image part is closely superimposed on a photosensitive resin layer via or without a slip coat layer and an actinic radiation is given from the upper side thereof for exposure. As a result, only the exposed part is insolubilized or photocured. The actinic radiation can be given from a light source generally having a wavelength of 300–45 nm, such as a high pressure mercury lamp, an ultrahigh pressure mercury lamp, a metal halide lamp, a xenon lamp and the like.

Using a suitable solvent, particularly neutral water in the present invention, the non-exposed part is dissolved and removed, whereby a relief having a clear image part is obtained. As the developing apparatus, a spray developing apparatus, a brush developing apparatus and the like can be used.

A sign board of the present invention having a relief plate can be formed by the above-mentioned method. The use can be expanded by producing various sign boards by coloring the relief with paint, adding a pigment to a support, coloring or patterning the back of a support, gluing a decorative laminate sheet etc., and the like.

The present invention is explained in detail by referring to examples. The present invention is not limited by these examples in any way. The UV absorbance and light resistance were measured/tested by the following methods.

UV absorbance: A specimen was cut out in the size of 30 mm×70 mm (thickness of photosensitive resin layer: 800 μm, thickness of support: 2000 μm) and subjected to the measurement of absorbance of UV at 400 nm using a U-3210 self-recording spectrophotometer manufactured by Hitachi, Ltd.

light resistance test: Using a Sunshine Weather Meter manufactured by Suga Test Instruments Co., Ltd., the specimen was irradiated with an arc carbon lamp for 500 hours and the light resistance was evaluated.

EXAMPLE 1

SPECTAR-UV manufactured by Eastman Chemical Company, wherein a UV quality change preventive layer (50 μm) containing a UV absorber is formed on the surface of a modified polyethylene terephthalate plate (thickness 2.0 mm) obtained by copolymerization of cyclohexanedimethanol, was used as a support.

As the adhesive layer, a polyester-urethane adhesive was used and a composition for an adhesive layer was prepared as follows. That is, a polyester resin (80 parts by weight, VYLON RV-200) manufactured by Toyo Boseki Kabushiki Kaisha was dissolved in a mixed solvent (1940 parts by weight) of toluene/methyl ethyl ketone=80/20 (weight ratio) while heating at 80° C. After cooling, DESMODUER HL (20 parts by weight, manufactured by Sumitomo Bayer Urethane) which is isocyanulate polyhydric isocyanate obtained from hexamethylene diisocyanate and toluene diisocyanate as starting materials, was added as isocyanulate polyhydric isocyanate, and triethylene diamine (0.06 part by weight) was added as a curing catalyst, and the mixture was stirred for 10 min.

The thus-obtained composition solution for adhesive layer was applied to a modified polyethylene terephthalate plate having the above-mentioned UV quality change preventive layer, in a film thickness of 12 μm and dry-cured at 50° C. for 20 min to give a support coated with an adhesive layer.

As a soluble polymer, ε-caprolactam (525 parts by weight), a nylon salt (400 parts by weight) of N-(2-aminoethyl)piperazine and adipic acid, and a nylon salt (75 parts by weight) of 1,3-bis(aminomethyl)cyclohexane and adipic acid were subjected to melt condensation polymerization in an autoclave to give a nylon copolymer containing a nitrogen atom.

The obtained polymer (55 parts by weight) was dissolved in methanol (200 parts by weight) at 60° C., and glycidyl methacrylate (2 parts by weight) was added. The mixture was stirred for 3 h to allow reaction of polymer ends with glycidyl methacrylate. Methacrylic acid (4 parts by weight) was added to this solution and acrylate (35 parts by weight) obtained by ring opening-addition of glycidyl ether of ethylene glycol and acrylic acid, N-ethyltoluenesulfonamide (5 parts by weight), hydroquinone monomethyl ether (0.1 part by weight), and benzyldimethylketal (1.0 part by weight) were added to give a photosensitive resin composition solution. This solution was cast over a polyester film, on which polyvinyl alcohol having a degree of hydrolysis of 98% had been applied in 2 μm, and methanol was evaporated to give a photosensitive resin layer precursor having a thickness of about 800 μm. The obtained photosensitive resin layer precursor showed an absorbance at 400 nm of 0.10 and was transparent and colorless.

The photosensitive resin layer precursor obtained as above and a support coated with an adhesive layer can be glued by positioning the photosensitive resin composition surface on the support surface and pouring water into the interface. The photosensitive resin layer was press adhered at room temperature at 25° C. through rubber rollers having an adjusted gap clearance according to the laminate thickness, whereby a photosensitive resin laminate was produced. The photosensitive resin laminate was stood for one day and cut into a predetermined size with a cutter with circular saw. A negative was placed thereon and subjected to exposure, developing, drying and post-exposure treatment to give a sign board having a relief.

The obtained photosensitive resin sign board was subjected to a light resistance test for 500 h, and absorbance at 400 nm was measured. The absorbance of the support was 0.10 and the support was superior in light resistance.

COMPARATIVE EXAMPLE 1

In the same manner as in Example 1 except that a modified polyethylene terephthalate plate without a UV quality change preventive layer was used as a support, a sign board was obtained.

The obtained photosensitive resin sign board was subjected to a light resistance test for 500 h, and absorbance at 400 nm was measured. The absorbance of the support was 0.45 and the support was poor in light resistance.

Due to the constitution as mentioned above, a sign board obtained using a photosensitive resin laminate of the present invention has a transparent and colorless support having superior design and superior light resistance with a smaller coloring level due to UV. In other words, the photosensitive resin laminate of the present invention can provide a suitable sign board and greatly contributes to the industry.

What is claimed is:

1. A photosensitive resin laminate for a sign board, which comprises a support and a photosensitive resin layer having a thickness of not less than 500 μm formed at least on the support via an adhesive layer,
   wherein the photosensitive resin layer has an absorbance at 400 nm of not more than 0.4,
   the support is a modified polyethylene terephthalate layer and a UV quality change preventive layer is provided directly on the modified polyethylene terephthalate layer.

2. The photosensitive resin laminate of claim 1, wherein the UV quality change preventive layer comprises a UV absorber.

3. The photosensitive resin laminate of claim 1, wherein the UV quality change preventive layer is produced by coextrusion forming.

4. The photosensitive resin laminate of claim 1, wherein the support has a total light transmission of not less than 60%.

5. The photosensitive resin laminate of claim 1, wherein the support has an absorbance at 400 nm of not more than 0.4.

6. The photosensitive resin laminate of claim 2, wherein the UV quality change preventive layer has a thickness of 5 μm–100 μm.

7. The photosensitive resin laminate of claim 1, further comprising an adhesive layer,
   wherein the layers are laminated in the order of the modified polyethylene terephthalate layer, the UV quality change preventive layer, the adhesive layer, and the photosensitive resin layer.

8. The photosensitive resin laminate of claim 1, further comprising an adhesive layer,
   wherein the UV quality change preventive layer substantially covers only one side of the modified polyethylene terephthalate layer and wherein the layers are laminated in the order of the modified polyethylene terephthalate layer, the UV quality change preventive layer, the adhesive layer, and the photosensitive resin layer.

9. The photosensitive resin laminate of claim 1, wherein the modified polyethylene terephthalate layer comprises modified polyethylene terephthalate wherein cyclohexanedimethanol is copolymerized as a diol component.

10. The photosensitive resin laminate of claim 1, wherein the support has a thickness of about 1 to 10 mm.

11. The photosensitive resin laminate of claim 1, wherein the photosensitive resin layer has a thickness of 800-1200 µm.

12. The photosensitive resin laminate of claim 1, wherein the photosensitive resin layer comprises a nylon copolymer.

* * * * *

UNITED STATES PATENT AND TRADEMARK OFFICE
CERTIFICATE OF CORRECTION

PATENT NO. : 7,282,256 B2 Page 1 of 1
APPLICATION NO. : 10/319531
DATED : October 16, 2007
INVENTOR(S) : Howard B. Vreeland, Jr. et al.

It is certified that error appears in the above-identified patent and that said Letters Patent is hereby corrected as shown below:

Title Page, Item (73), please replace the name of the first-listed Assignee:

"Anderson & Vreelan"

with:

--Anderson & Vreeland--

Signed and Sealed this

Fifteenth Day of April, 2008

JON W. DUDAS
*Director of the United States Patent and Trademark Office*